(12) United States Patent
Soar

(10) Patent No.: US 7,863,859 B2
(45) Date of Patent: Jan. 4, 2011

(54) CONTACTLESS BATTERY CHARGING APPAREL

(75) Inventor: Roger J. Soar, Kelowna (CA)

(73) Assignee: Cynetic Designs Ltd., Kelowna, British Columbia (CA)

( * ) Notice: Subject to any disclaimer, the term of this patent is extended or adjusted under 35 U.S.C. 154(b) by 269 days.

(21) Appl. No.: 11/922,788

(22) PCT Filed: Jun. 28, 2006

(86) PCT No.: PCT/CA2006/001078

§ 371 (c)(1),
(2), (4) Date: Dec. 21, 2007

(87) PCT Pub. No.: WO2007/000055

PCT Pub. Date: Jan. 4, 2007

(65) Prior Publication Data

US 2009/0218884 A1  Sep. 3, 2009

(51) Int. Cl.
H03K 3/00 (2006.01)
H01F 27/42 (2006.01)
H02J 3/14 (2006.01)

(52) U.S. Cl. .................. 320/108; 307/104

(58) Field of Classification Search ............ 307/90, 307/104, 108; 320/108
See application file for complete search history.

(56) References Cited

U.S. PATENT DOCUMENTS

| | | | |
|---|---|---|---|
| 5,959,433 A | 9/1999 | Rohde | |
| 6,388,422 B1 | 5/2002 | Lew | |
| 6,476,581 B2 | 11/2002 | Lew | |
| 6,490,176 B2 | 12/2002 | Holzer et al. | |
| 6,906,495 B2 | 6/2005 | Cheng et al. | |
| 6,960,968 B2 | 11/2005 | Odendaal et al. | |
| 7,076,206 B2 * | 7/2006 | Elferich et al. | ............. 455/41.1 |
| 2002/0154518 A1 | 10/2002 | Elferich et al. | |
| 2004/0145343 A1 | 7/2004 | Naskali et al. | |
| 2004/0189246 A1 | 9/2004 | Bulai et al. | |
| 2006/0087282 A1 | 4/2006 | Baarman et al. | |

FOREIGN PATENT DOCUMENTS

EP       1610439 A1    12/2005
WO     WO 00/16493     4/2000

OTHER PUBLICATIONS

U.S. Appl. No. 10/733,221, filed Jun. 15, 2005, Boateng.
U.S. Appl. No. 10/975,096, filed Apr. 27, 2006, Tso.

* cited by examiner

*Primary Examiner*—Jared J Fureman
*Assistant Examiner*—Michael Rutland Wallis
(74) *Attorney, Agent, or Firm*—Anthony C. Edwards

(57) ABSTRACT

A sequential power transmission between a portable user-carried battery and first and second independent accessories. At least one primary inductive coupling coil is mounted on an article of apparel worn by the user, so as to place a primary coil adjacent a first intermediary inductive coupling coil on the first independent accessory. The energizing of the first intermediary coil energizes a second intermediary coil on the first independent accessory. The second intermediary coil, when energized, energizes a secondary coil on the second independent accessory for powering the use, including the charging of the batteries of that accessory.

9 Claims, 7 Drawing Sheets

CONTACTLESS BATTERY CHARGING APPAREL

FIELD OF THE INVENTION

This invention relates to the field of devices for contactless inductively-coupled charging of batteries, and in particular to contactless battery charging apparel having a means of providing peripheral electronic device distributed battery charging without the use of mechanical conductive contacts by using contactless inductive loop technology.

BACKGROUND OF THE INVENTION

The future soldier will be equipped with a comprehensive array of electronic devices that provide him with C4I (Command, Control, Communications, Computer, Intelligence) situational awareness and targeting capability. The equipment must be both sophisticated and rugged.

Common to every piece of electronic equipment is its requirement for power. Electrical power is provided to all man portable electronic devices via a battery source that is typically small cell designs such as commercially designated AAA, AA, C and various military battery configurations. All the devices have different power needs and therefore the batteries for each device have different voltages, current and power cell size requirements.

When a soldier is tasked with a mission he must replenish all the batteries in all of the electronic devices he will be carrying. The soldier must also determine if the duration of the mission will require him to carry spare batteries for his equipment especially if he will be dismounted and away from support for the duration of the mission.

Contactless inductive energy transfer is known in the art as a convenient way to transfer energy. See for example U.S. Pat. Nos. 6,490,176 and 5,959,433, and published United States Patent Applications, Publication Nos. US2004/0189246 and US2004/0145343. What is addressed are ways to charge a battery in a discrete electronic device such as a cell phone, computer mouse, tooth brush, etc using a statically placed charger where the coil or loop in the charger is typically powered from mains electrical power so as to induce a current in the coil or loop in the discrete electronic device when the device and charger are in proximity. Typically the current in the coil or loop of the electronic device is rectified so as to provide direct current to charge the battery of the device.

What is neither taught nor suggested, and it is one object of the present invention to provide, is the use of a charging coil or loop or multiple charging coils or loops mounted to an article of apparel such as for example military load carriage vests, tactical pants, shirt, utility webbing or other load carriage purpose-designed apparel or the pockets associated with same, wherein the main power source for the charging coil or loops is a portable DC battery(ies) and carried on the users, for example on the apparel, so that various and multiple electronic devices having inductively chargeable batteries may be operatively carried and simultaneously on a demand basis charged while in use or being merely carried by a user such as a soldier.

Existing and future electronic equipment currently have a variety of wire harnesses between the devices for the purpose of power and data transmission. In order to standardize both power and data transmission connectors NATO has established a working group to identify and resolve how different countries connect their soldier mounted electronic equipment and to develop standard connector configurations.

With the advent of militarized Bluetooth®, USB and other wireless communication protocols, data transfer wires between soldier carried portable electronic devices are being rendered obsolete, however the provision of power to these devices still requires hard wired or breakaway umbilical power cords, or device specific battery replacement that requires a comprehensive battery logistic supply plan.

SUMMARY OF THE INVENTION

A system is described that alleviates the significant battery power logistic issues or hard wired power cable issues that are created by the use of soldier mounted electronic devices. Although practical now for one skilled in the art, this type of system will continue to be ever more practical as advances in power management reduce peripheral device power requirement and allow a low power trickle charge system to be used to advantage.

In one aspect, the contactless battery charging system according to the present invention is for inductive charging of rechargeable batteries operatively connected to secondary, inductive coupling coils in portable electronic devices when carried on or otherwise mounted on apparel meant to be worn by a user. The system may be characterized in one aspect as including:

a) a plurality of primary inductive coupling coils and corresponding driving circuits mounted to an article of apparel, so as to place the coils adjacent inductive coupling coils in electronic devices when the electronic devices are releasably mounted to the article by mounting means; and, b) a primary battery or batteries mounted or releasably mountable to the article of apparel and used to power the distributed individual primary inductive charging circuits.

By means of a distributed DC power conductor system that is terminated at a plurality of nodes, at each node is located a primary inductive coil and DC/AC driving circuit that couples to and inductively transfers energy to a secondary coil that then through a AC/DC rectifier charging circuit charges the rechargeable battery that is located in a portable electronic device which is carried on or otherwise mounted on apparel to be worn by the user. Alternatively, the AC (oscillator) drive circuit may be centrally located at the main battery power source and an AC circuit be transmitted to all the nodes.

The mounting means may include sleeves, pouches, pockets, or releasable fasteners such as snaps or hook-and-loop fasteners, carabiners, hooks, clamps, etc.

The coils may be of different types, and without intending to be limiting may be made from round, square or other section wire that is bonded or unbonded, foils, include wound planar, toroidal or custom shaped coils, with a round, rectangular, oval, triangular or other shape regular or irregular, with an air core or a ferrite, or powdered iron core or other material core or housing. Further the coils and driving circuit may be printed on a rigid or flexible printed circuit board or other substrates such as that demonstrated by radio frequency identification (RFID) antenna. A wide range of frequencies can be used for inductively coupled charging however, frequency ranges for efficient inductive coupling are typically between 50-400 KHz but are not limited to this frequency range and could also take advantage of very high frequencies for example, 13.56 MHz as used by RFID technology.

The size or power rating of the charging circuit is not limited, however if very large power charging requirements are necessary two or more discrete charging circuits and associated coils may be placed proximal to each other to take advantage of location size restrictions.

Corresponding primary charging coils in the apparel and secondary charging coils in electronic devices may be matched so as to be of the same type. An air gap between planar, toriod or other shape of coils may be provided by a thickness of fabric from which the article is fabricated and the lamination or enclosure for environmental and mechanical protection of the charging circuits. The coils may be oriented so as to lie flush, parallel or perpendicular or in any other orientation to the surface of a user's skin. The coils may also be oriented so as to lie flush or having a stand-off distance from the user's body.

Where multiple electronic devices are mounted as a sub-system on a separate platform such as a weapon or a helmet, charging coils can be located so that power is provided to the entire subsystem. For example where electronic devices are mounted to a rifle or other shoulder-fired or shoulder-carried weapon, equipment or instrument or tool or implement, the mounting means may include a pad or plate mounted adjacent a user's shoulder when in firing position or hip when in carrying position on the article of apparel or garment (collectively herein referred to as a "garment") so that a primary charging coil in the pad or plate is adjacent to the secondary coil in the rifle butt when properly positioned on the user's shoulder or hip. Alternatively, the mounting means is a glove having a coil in the palm for inductive coupling to a coil in the grip of a weapon, tool, implement, etc, in which embodiment the driving circuit may be remotely located distal from the glove or palm.

The articles of apparel (the "garment") may thus include webbing, vests, backpacks, harnesses, coats, shirts, belts, pants, shorts, gloves, goggles, glasses, hats, helmets.

The electrical conductors may include flexible wiring harnesses embedded in the articles of apparel or the use of conductive fabric. Power may thus be transferred through a power transmission harness, that may be wires or conductive fabric, to the charging locations or nodes that are positioned in predetermined locations on the garment or apparel. For additional robustness and safety the power transmission harness could also include safety devices such as re-settable poly switches that would activate in the event of a short circuit.

Battery charging may thus be provided on a demand basis to those devices that have a depleted energy level. So as to conserve power, intelligent primary circuits can be designed that only provide power to the primary charging coil when a secondary coil is placed proximal activation distance using hall effect or similar proximity sensors. Secondary charging circuits can be designed to accommodate all chemistries of rechargeable batteries such as but not limited to NiCd, NiMH, Li-Poly, Lithium Ion.

In summary, in a further aspect the present invention may be characterized as including an inductively coupled sequential power transmission system having:

a) a primary power source adapted for portable wearing by a user;
b) a garment having an electrically conductive first electrical network mounted therein wherein the first electrical network has an infeed end mountable to, in electrical communication with, the primary power source, and outfeed nodes;
c) a first set of electrically conductive primary coils electrically connected to the outfeed nodes;
d) a first independent accessory, that is, an accessory which is not electro-mechanically coupled or tethered or otherwise attached to the garment or its nodes, having an inductively coupled sequential power transmission sub-system mounted thereon, wherein the sub-system includes a second electrical network having at least one electrically conductive conduit extending from an infeed end to an outfeed end, and wherein at least one electrically conductive first intermediary coil is mounted at the infeed end of the second electrical network in electrical communication therewith and wherein at least one electrically conductive second intermediary coil is mounted at the outfeed end of the second electrical network; and,
e) a second independent accessory having an electrically conductive secondary coil which is adjacent the at least one electrically conductive second intermediary coil when the first and second independent accessories are in use by the user so as to energize the secondary coil when the at least one electrically conductive second intermediary coil is energized, whereby an end use of the second independent accessory is energized by the energizing of the secondary coil.

When the first independent accessory is in use by the user a first intermediary coil is adjacent a primary coil of the first set of electrically conductive primary coils so as to inductively couple the primary coil to the first intermediary coil when the former is energized to thereby energize a second intermediary coil. The second intermediary coil then energizes a secondary coil on the second independent accessory thereby powering an end use of that accessory, for example charging its battery or providing for the designed use of that accessory.

When the garment is for wearing on a torso of the user and when the first accessory includes a helmet, a first intermediary coil may be mounted at an upper-most end of the garment and adjacent the helmet when worn by the user in which case a first intermediary coil may be mounted at a lower edge of the helmet. The second accessory may then include a helmet mountable accessory or accessories are chosen from the group comprising: logic processors, data processors, night vision goggles, communication devices, display devices, audio devices including headphones or microphone, three-dimensional sound location systems, video devices. A second intermediary coil may thus be mounted at a forward facing surface of the helmet.

The first accessory may include a first rechargeable battery electrically connected to the second electrical network for recharging of the first rechargeable battery from the energizing of a first intermediary coil. The second accessory may include a second rechargeable battery electrically connected to the secondary coil for recharging of the second rechargeable battery from the energizing of the secondary coil.

In a further example wherein the garment is for wearing on at least a torso of the user, the first accessory may be weapon sub-system and the primary coils may include a primary coil mounted on a shoulder portion of the garment so as to abut against a stock of the weapon sub-system when shoulder-mounted by the user. In a preferred embodiment, a first intermediary coil may be mounted on the stock of the weapon sub-system, for example the stock of a rifle, so as to be then adjacent the primary coil on the shoulder portion. In a further preferred embodiment, when the garment also covers a hip portion of the user a primary coil may be mounted on the hip portion of the garment so as to be adjacent the stock of the weapon sub-system when carried on the hip by the user in a hip-carrying mode.

BRIEF DESCRIPTION OF THE DRAWINGS

FIG. 1b is an alternative embodiment of the contactless battery charging device of FIG. 1a.

DETAILED DESCRIPTION OF EMBODIMENTS OF THE INVENTION

Figure 1:
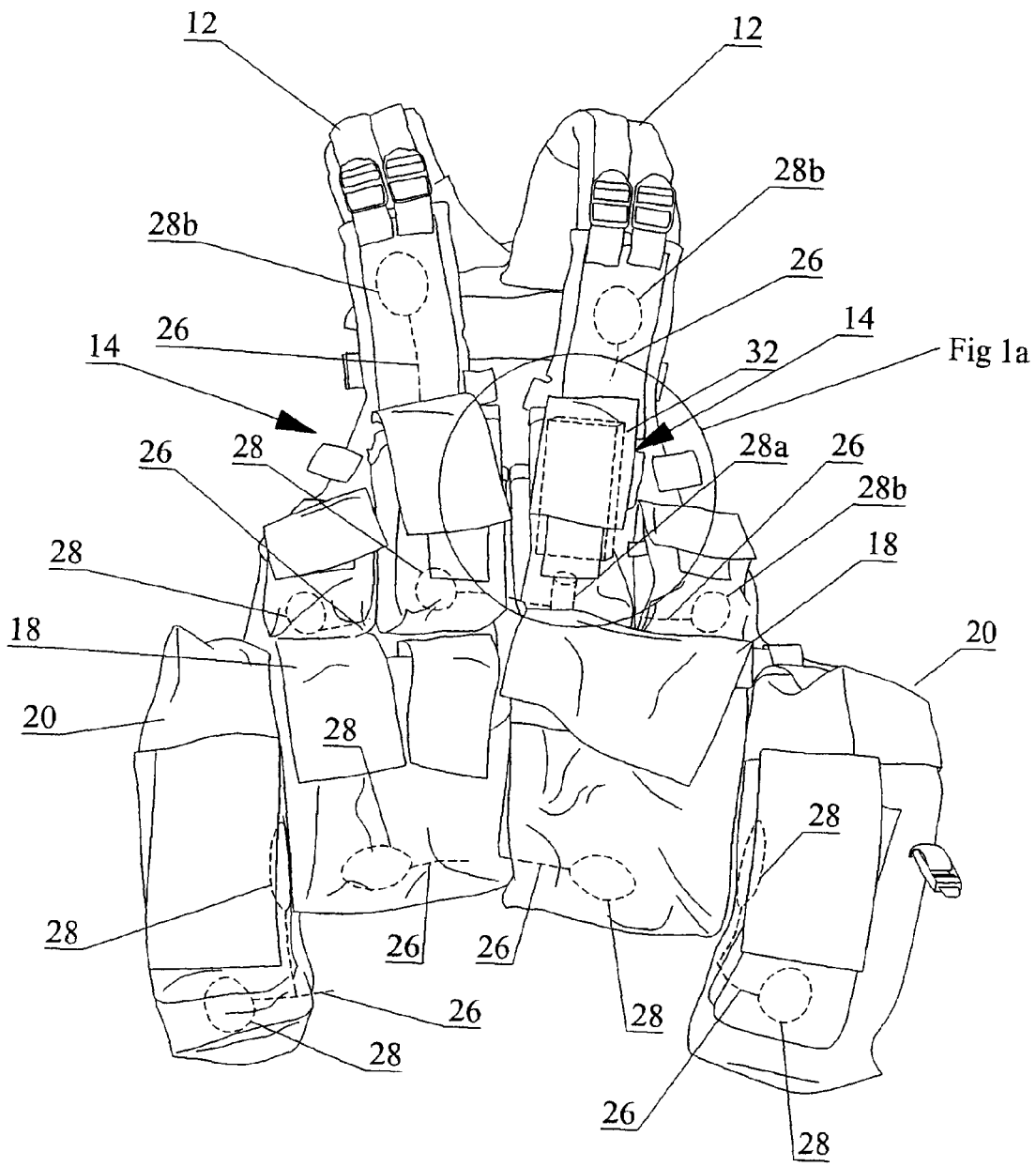
FIG. 1 is, in front elevation view, a military style vest containing contactless battery charging devices for charging electronic devices placed in pockets or mounted to the vest.
Figure 1A:
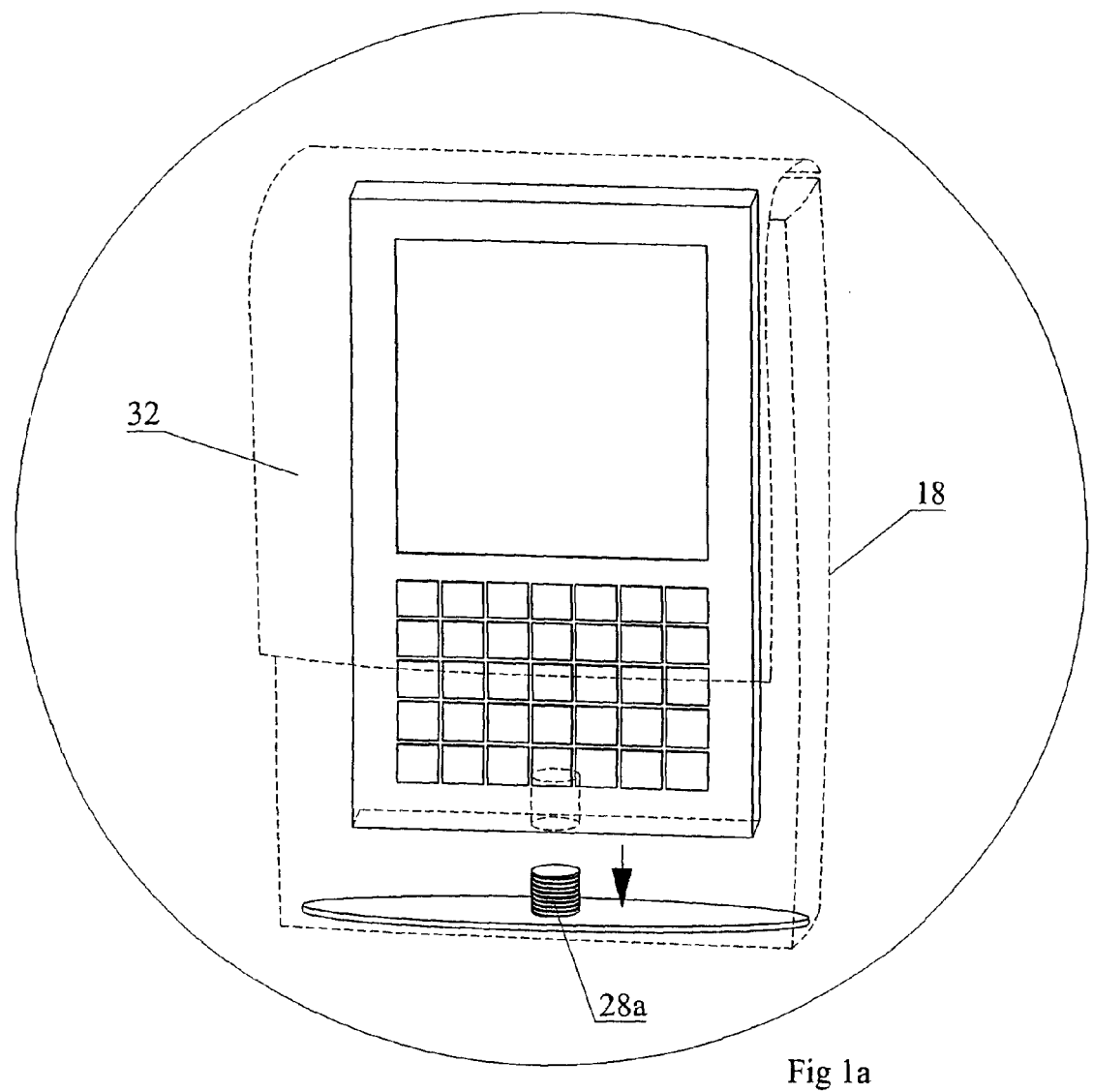
FIG. 1a is an enlarged view of a portion of FIG. 1.
Figure 1B:
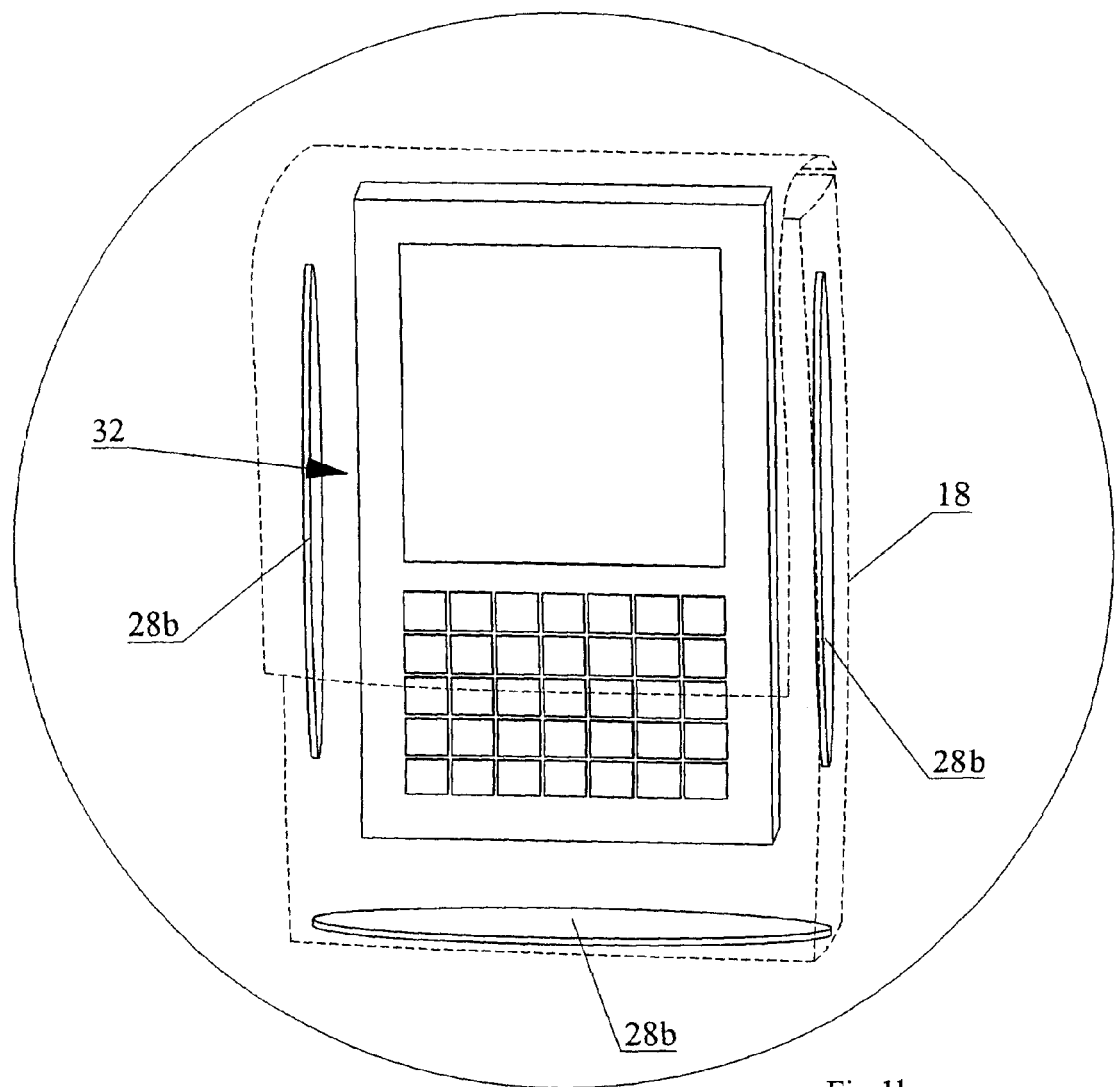

An average consumer in today's society is faced daily with the use of, or with others using, discrete portable handheld electronic devices including toothbrushes, shavers, cellular telephones, personal music players, cameras, digital organizers, laptop computers, etc. Many of these devices employ rechargeable batteries requiring that, on typically frustratingly frequent intervals, the batteries must be charged from a mains electrical supply. Such a mains electrical supply may take the form of a wall-socket plug-in transformer having an electrical cable the end of which is mated to the electronic device, a docking station having electrical contacts for mating with corresponding contacts on the electronic device, or, as already described, inductive-charging base units.

The average consumer may at any one time during, for example, in a typical work day, be carrying two or three such electronic devices, the batteries of which will require charging at some point. The advantage that such a consumer has is that at some point, on a regular and frequent interval, the consumer will return to an office, residence, hotel, etc where the consumer will expect to reside for long enough so that an electronic device, if connected to mains, will have time to adequately re-charge its battery or batteries.

Consider now an entirely less civilized and entirely less routine environment; that of the battlefield. The notion of a single soldier being a stand-alone "army-of-one" may in some circumstances be true, although perhaps more commonly a single soldier forms but one entity in a cohesive small group, such as a platoon, which itself moves and functions as a single cohesive entity, itself part of a larger cohesive military body being co-ordinated with other such bodies for the attainment of a strategic objective. The latter is obtained by successfully obtaining often innumerable much lesser objectives by the former. All of which have to be co-ordinated typically by audio, visual and data transfer by radio and other telemetry means. Consequently, in order to function as a stand alone "army-of-one" a soldier must be able to operate his weaponry, communications and sensing devices and other equipment for long periods of time independently of any centralized equivalent of a civilian mains electrical power supply. Further, in order to function as a co-ordinated element in a military campaign, operability of a soldiers weapons, communication equipment, computer equipment, if any, or like data processors, navigational equipment, etc, again for long periods of time independently of any centralized equivalent of a civilian mains electrical power supply is paramount. Future forces must be easy to deploy and sustain and must have power systems that are adaptable to changing missions, that is, be tactically flexible, and must therefore offer integrated modular solutions.

Consequently the need exists, and the present invention provides, for the recharging of a soldier's electronic devices by inductive coupling of a loop or coil, whether it be toroidal, planar, printed or otherwise, in each such electronic device when the device is placed on, or proximal to, mounted to, carried near, or stored in a piece of apparel so as to cooperate with corresponding charging loops or coils in or on the apparel. Power to the coils is provided through, for example, a discrete wiring harness from a central larger capacity battery(ies) worn by the soldier. The system could have a dual (split for example on the left and right of the torso) battery power supply that would provide significant performance advantages from an ergonomic, practical and damage tolerant (redundancy) perspectives.

Figure 2:
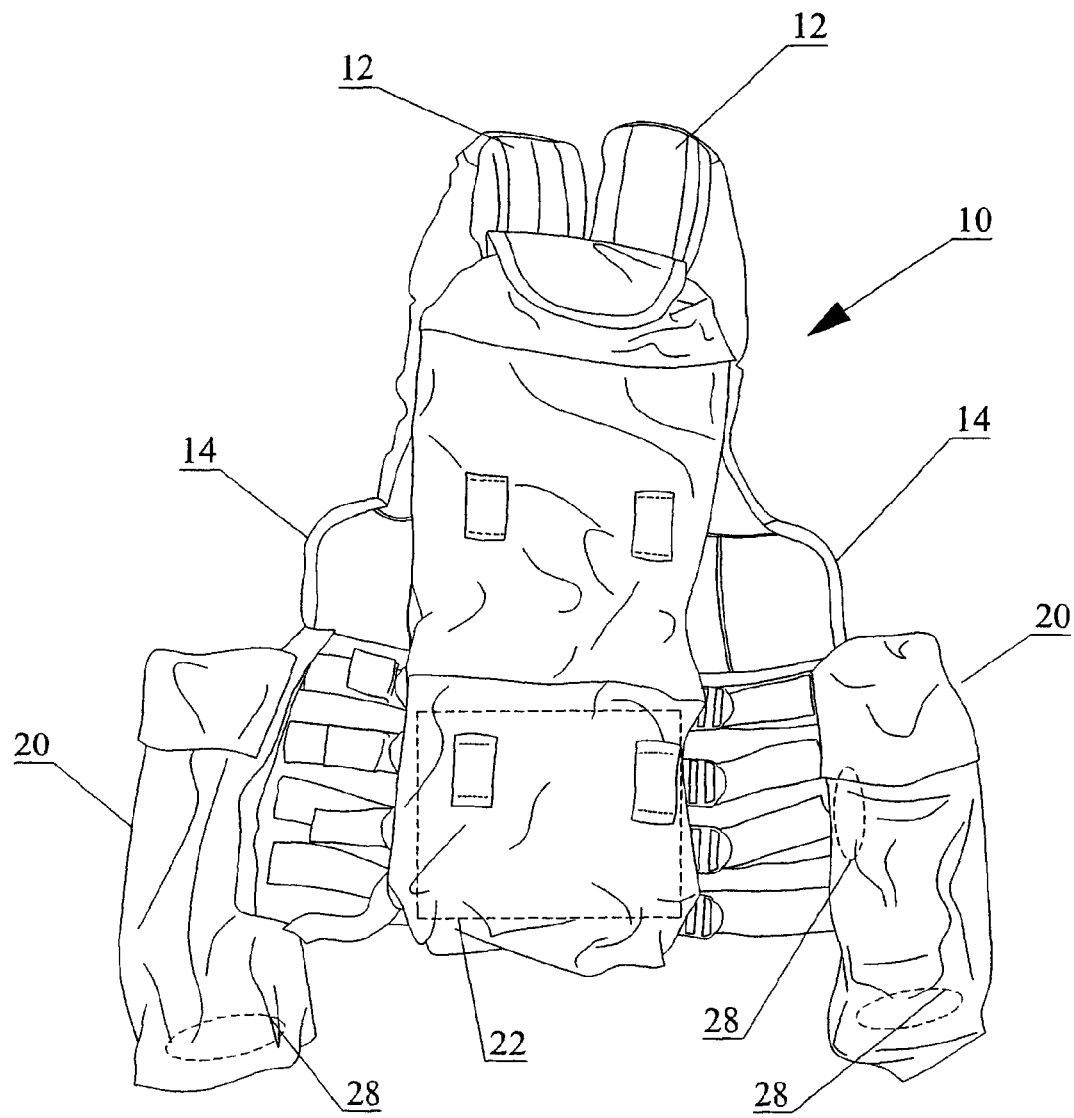
FIG. 2 is, in rear elevation view, the vest of FIG. 1.
Figure 3:
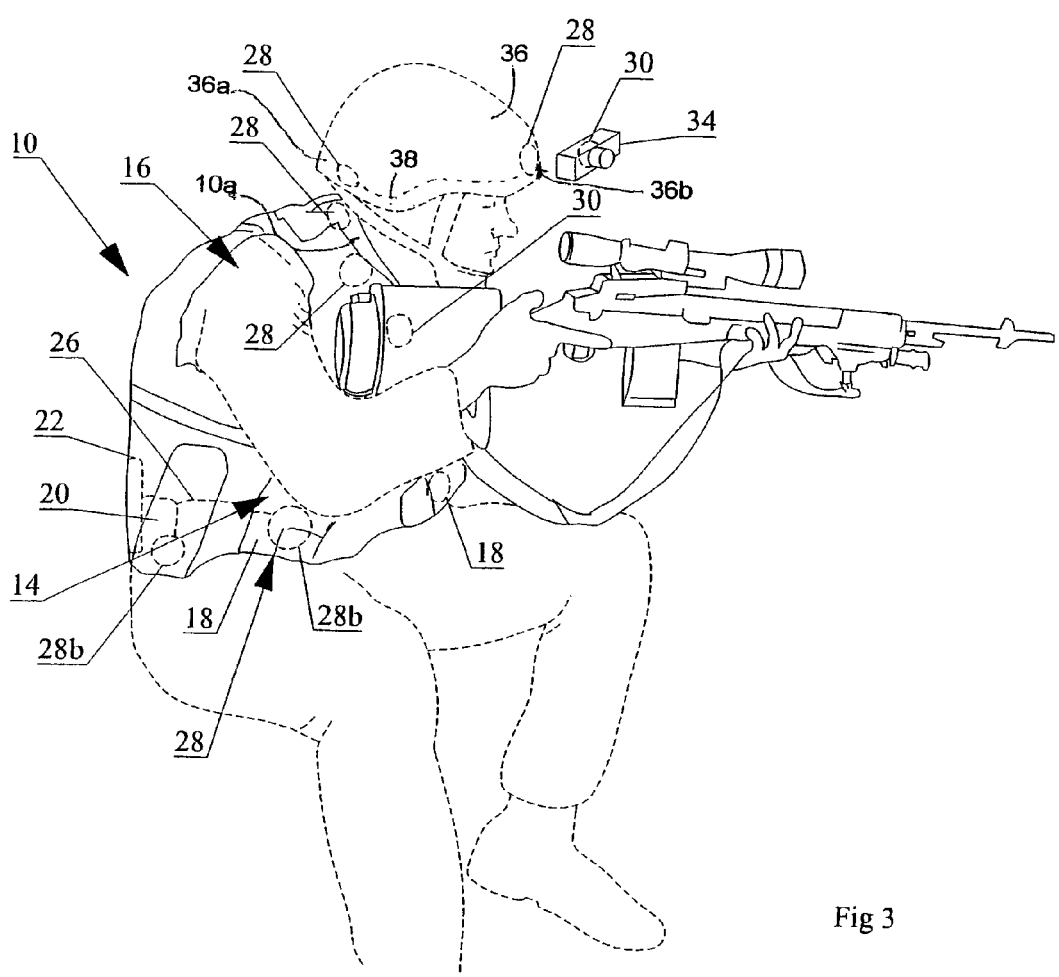
FIG. 3 is, in perspective view, the vest of FIG. 1 in use.
Figure 4:
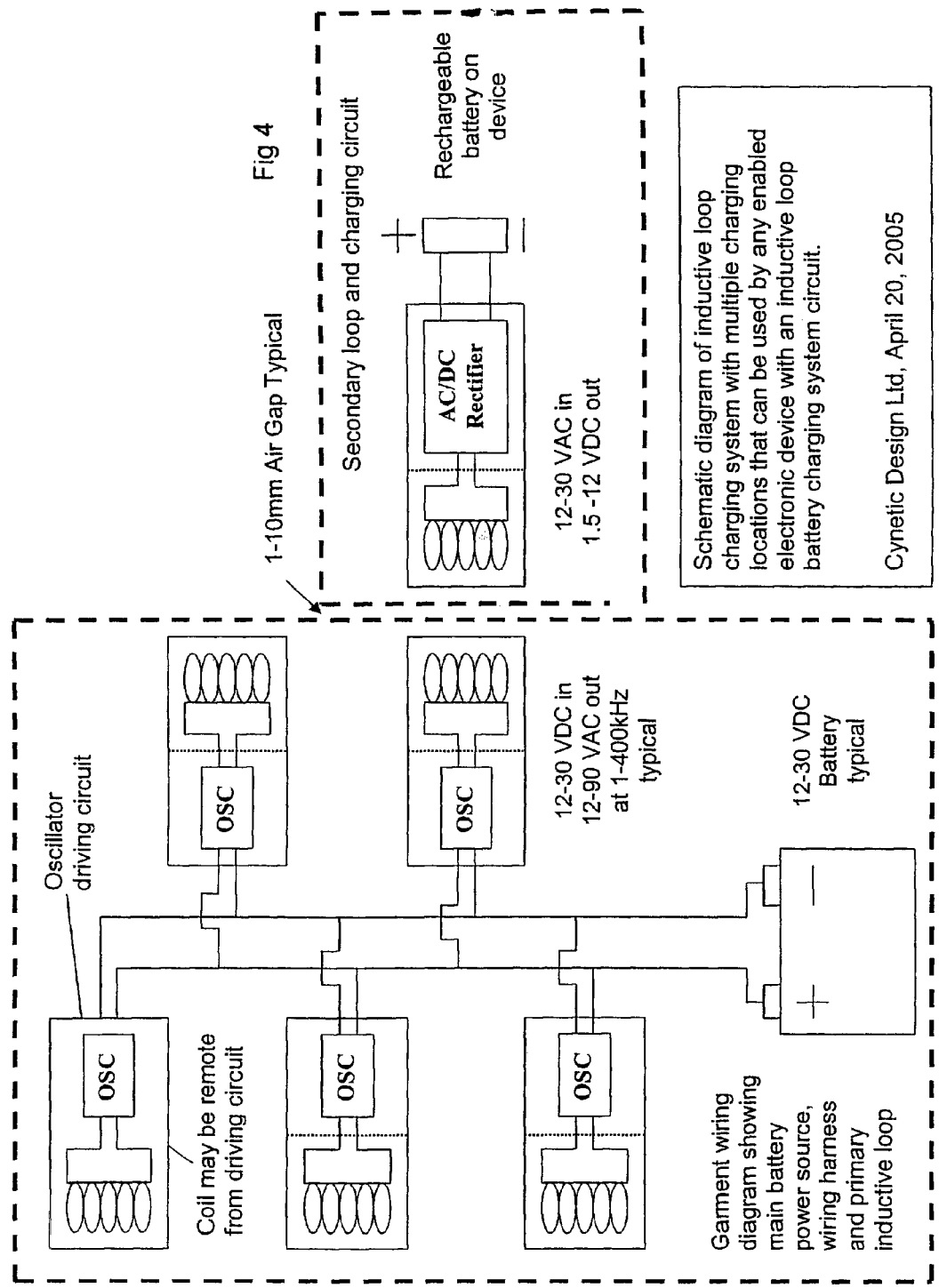
FIG. 4 is an electrical diagrammatic view of a portion of the vest of FIG. 1 wherein oscillator driving circuits and inductive loops are positioned at each charging node.
Figure 5:
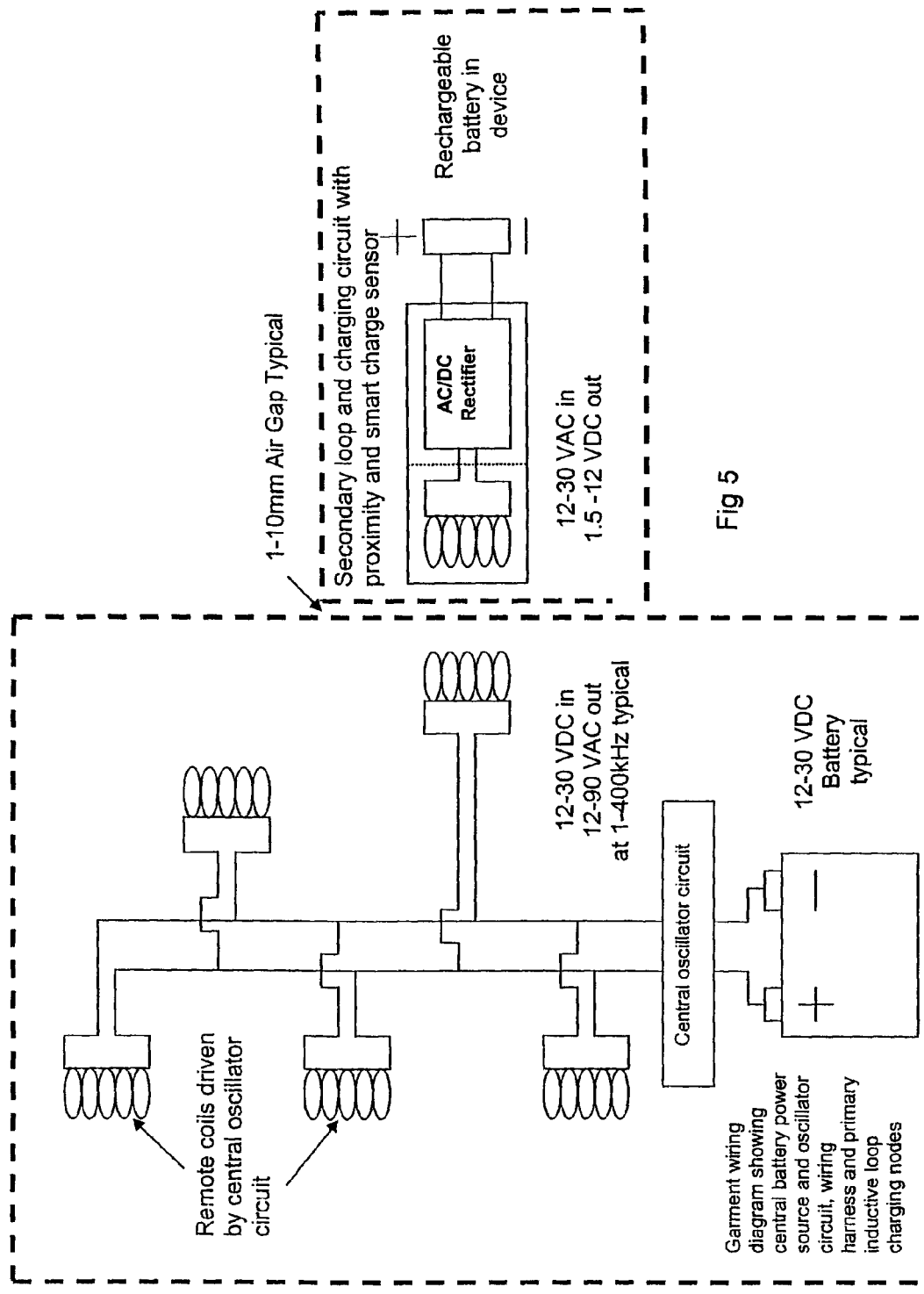
FIG. 5 is an alternative electrical diagrammatic view of a portion of the vest of FIG. 1, wherein a central oscillator drives inductive coils at each charging node.

Take for example, and without intending to be limiting, the military vest 10 of FIGS. 1-3. Shoulder straps 12 support panels 14 on either flank of torso 16. Pockets 18 are mounted to panels 14 and straps 12. Additional containers 20 may also be mounted to the sides and rear of vest 10. A main battery 22 is carried on, or is removably mounted to, a waist belt 24 for example to the rear of vest 10. Waist belt 24 may, but need not necessarily be, integral to vest 10 so long as electrical wiring 26 in vest 10 may be electrically connected to battery 22. Coils or loops 28 such as toroidal coil 28a or planar coils 28b are mounted into panels 14 or into the walls of pockets 18, or in such other locations so as to be adjacent corresponding inductive charging coils or loops 30 in the soldier's electronic accessories or devices, such as GPS 32 or night-vision goggles 34. GPS 32 and goggles 34 represent rechargeable tools, but are not intended to be limiting.

Examples, but not intended to be limiting, of military devices that would be on or carried by a soldier, and which would require re-designed inductively charged battery packs according to the present invention, but not re-designed devices, and which thus provide for moving across technology generations include:

a) for the body: flashlight, GPS, radio (unit+command), PDA, computer, interface device (display, mouse and keyboard), biometric and wound sensing systems, NBC sensors b) for the helmet: night vision, heads up display, daytime video, earphones and microphone, 3D sound location system c) for the rifle: the weapon itself, laser aiming module, video sight, thermal sight, red dot sight Inductive loops may be placed in two principle types of location, namely:

a) pockets intended for the stowage of electronic devices, wherein a loop would be placed inside a pocket, and wherein the loop may be either planar, toriodal, printed or otherwise or a loop designed for interface to specific item (for example flashlight), and b) locations not used for storage of electronic devices, for example external locations such as a rifle butt pad, and which also may include areas such as the collar to provide an interface to the helmet; and, shoulder and hip locations to provide charging to rifle butt and rifle mounted devices.

It is understood that the reference to rifle is not intended to be limiting as other weapon sub-systems may be substituted, although these will likely be weapons having a stock or other structure allowing for the shoulder mounting of the weapon sub-system, (collectively referred to herein as a stock).

The present invention also is intended to include within its scope the use of sequential loops, for example vest collar to a first accessory such as a helmet, and then from the helmet to a second accessory such as an earpiece and microphone. Sequential power transmission to the remote accessory or device is by the use of a sequential array of inductive loops 28 which may be brought into coupled proximity with each other during ordinary use of, for example, the vest, helmet and headset. Thus as seen in FIG. 3, power is transferred from a primary coil such as loop 28 on collar 10*a* of vest 10 to an adjacent first intermediary coil such as loop 28 on the lower edge 36*a* on helmet 36, and then, via a second electrical wiring network 38, to a second intermediary coil such as loop 28 on the front surface 36*b* of the helmet. Power may then be transferred inductively from the second intermediary coil to a secondary coil such as loop 30 on a helmet-mounted sub-system. The same sequential power transmission principle may be applied to supply power to weapon sub-systems by sequential power transmission fromo the vest or other garment to the weapon stock and then to the sub-system.

The benefits of each electronic device having a contactless charging system according to the present invention may include:

Mechanical charging contacts are eliminated from the exterior of the device allowing the device to be made environmentally rugged.

The device is constantly charged when stowed and will be kept at an optimal state of readiness.

Access to batteries is significantly reduced as the batteries do not have to be accessed or replaced on a regular basis, this in turn means:

Battery compartment covers are no longer required to be readily opened for battery access. This reduces the opportunity for battery compartment covers to be lost or broken when on or between missions. Serviceability of equipment therefore is higher and the requirement for spare equipment is reduced. Significant reduction of equipment failure during missions would be realized.

Significant improvement of support logistics as plethora of replacement device batteries required during mission or at base camp is eliminated Daily time spent replacing numerous device batteries is eliminated Centralized larger capacity main power batteries are quickly exchanged or more easily field charged than small capacity device batteries All electronic equipment can be used without a power cord tethering it to the soldier eliminating potential for catching wires, eliminating opportunity for broken power cables or devices and increasing soldier safety.

System takes advantage of both distributed power from a central source as well as maintaining power reserve at each device Opportunity to reduce weight of device as batteries do not have to have to be as large as they do not require prior reserve capacity Only the battery compartment of a device needs re-engineering, the principle device remains unchanged.

When at base camp or in vehicle can connect with hard power wire to charge main battery and peripherals at the same time.

Main batteries can be charged with inductive loop also when in vehicle or at camp Inductive loop charging technology readily moves across future device generations Increased compatibility between NATO forces as incompatibility of electrical connectors is eliminated or reduced Provides a platform for planned graceful power degradation to peripheral devices Provides a platform that allows for the implementation of a central power management system that can include State of Charge (SOC) indicators.

A further application would be on Nuclear Biological Chemical (NBC) or Chemical Warfare (CW) clothing. As the inductive charging can power electronic devices through fabric, there is an opportunity to power electronic systems that are placed on the inside of NBC or CW garments. External power sources for devices inside the garment could easily be exchanged without the need to open the garment or requiring difficult to secure openings or 'vias' that may compromise the integrity of the suit and present a life threatening situation to the user.

Inductive Loop Technology

Inductive loop and support circuits are very low profile and have virtually no weight. Each primary power loop would typically have a nominal voltage of 12, 15, 24 or 30 volts, or other voltage provided by in service and future portable military batteries, the design and number of wire turns of the receiving or secondary charging loop/battery charger dictate the charging voltage. A smart sensor may turn off the circuit when charging is not required. Both the device and apparel inductive charging loops may be configured to be dedicated or generic.

Helmet and Weapon Subsystem Charging

One of the biggest complaints of the future soldier system is the umbilical, tether or cable connections that pass between the soldier and his weapon and helmet. Significant issues arise over connector type and compatibility, time and attention required for intentional disconnects and reconnection, and unintentional disconnects due to snagging. Inherent in any disconnect/reconnect activity is the opportunity to damage a critical connector contact due to forcing by the user or environmental contamination.

As wireless transmission capabilities continue to rapidly evolve in bandwidth and security, the ability to transfer video and data without cables between the soldier and his sub-systems becomes more of a reality every day.

The application of wireless data transfer and wireless power transfer would eliminate all umbilical' between the weapon and helmet sub-systems. Power will be transferred to each sub-system using coils located at interface areas versus storage pockets. The weapon would have two receiving coils in the stock and driving coils would be positioned at two locations on the soldier. A coil would be placed on the shoulder so power is transferred whenever the weapon is shouldered and nominally at the same time many weapon components are powered up. So the weapon component internal batteries can be charged while marching with the weapon slung, a primary coil would be located on the front of the load carriage ensemble. The helmet would require a receiving coil on the rear lower edge that would interface with a primary coil on the upper back of the soldier. Example electronic equipment that has the potential for inductive power charging is presented in Table 2.

TABLE 2

Example Components that can be charged with inductive coupling system

| Torso | Weapon Sub-system | Helmet Sub-system |
| --- | --- | --- |
| Physiological Monitors | Night Vision | Night Vision |
| Keyboard | Thermal Weapon Sight | Helmet mounted display |
| GPS | Micro Laser Rangefinder | Enhanced hearing |
| Tactical Radio(s) | Aiming Lights | Mic/speaker |
| Flashlight | Sniper Night Vision | WLAN Antenna |
| CW Sensors | Smart Weapon | |
| PDA/computer | Daylight video | |
| Target Locator | | |
| Card Reader | | |

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An inductively coupled sequential power transmission system comprising:

a primary power source adapted for portable wearing by a user, a garment having an electrically conductive first electrical network mounted therein wherein said first electrical network has an infeed end mountable to, in electrical communication with, said primary power source, and outfeed nodes, a first set of electrically conductive primary coils electrically connected to said outfeed nodes, a first independent accessory having an inductively coupled sequential power transmission sub-system mounted thereon, wherein said sub-system includes a second electrical network having at least one electrically conductive conduit extending from an infeed end to an outfeed end, wherein at least one electrically conductive first intermediary coil is mounted at said infeed end of said second electrical network in electrical communication therewith and wherein at least one electrically conductive second intermediary coil is mounted at said outfeed end of said second electrical network, and wherein when said first independent accessory is in use by the user said at least one electrically conductive first intermediary coil is adjacent at least one primary coil of said first set of electrically conductive primary coils so as to inductively couple said at least one primary coil to said at least one first intermediary coil when the former is energized to thereby energize said at least one electrically conductive second intermediary coil, a second independent accessory having an electrically conductive secondary coil which is adjacent said at least one electrically conductive second intermediary coil when the first and second independent accessories are in use by the user so as to energize said secondary coil when said at least one electrically conductive second intermediary coil is energized, whereby an end use of said second independent accessory is energized by said energizing of said secondary coil, wherein said garment is for wearing on at least a torso of the user and wherein said first accessory is a weapon sub-system and wherein said at least one primary coil includes at least one primary coil mounted on a shoulder portion of said garment so as to abut against a stock of said weapon sub-system when shoulder-mounted by the user, and wherein said at least one electrically conductive first intermediary coil is mounted on said stock so as to be then adjacent said at least one primary coil on said shoulder portion.

2. The system of claim 1 wherein said garment is for wearing on a torso of the user and wherein said first accessory includes a helmet, and wherein said at least one electrically conductive first intermediary coil is mounted at an uppermost end of said garment and adjacent said helmet when worn by the user.

3. The system of claim 2 wherein said second accessory includes a helmet mountable accessory.

4. The system of claim 3 wherein said helmet mountable accessories are chosen from the group comprising: logic processors, data processors, night vision goggles, communication devices, display devices, audio devices including headphones or microphone, three-dimensional sound location systems, video devices.

5. The system of claim 3 wherein said at least one first intermediary coil is mounted at a lower edge of said helmet.

6. The system of claim 5 wherein said at least one second intermediary coil is mounted at a forward facing surface of said helmet.

7. The system of claim 1 wherein said first accessory includes a first rechargeable battery electrically connected to said second electrical network for recharging of said first rechargeable battery from said energizing of said at least one electrically conductive first intermediary coil.

8. The system of claim 1 wherein said second accessory includes a second rechargeable battery electrically connected to said secondary coil for recharging of said second rechargeable battery from said energizing of said secondary coil.

9. The system of claim 1 wherein said garment covers a hip portion of the user and wherein said at least one primary coil is mounted on said hip portion so as to be adjacent said stock when said weapon sub-system is in a hip-carrying mode by the user.

* * * * *